(12) United States Patent
Takano et al.

(10) Patent No.: US 11,611,087 B2
(45) Date of Patent: Mar. 21, 2023

(54) METHOD OF PRODUCING RESIN FRAME MEMBER FOR FUEL CELL AND PROCESSING DIE

(71) Applicant: HONDA MOTOR CO., LTD., Tokyo (JP)

(72) Inventors: Ryo Takano, Wako (JP); Yusuke Wada, Wako (JP); Kento Kusatsugu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 142 days.

(21) Appl. No.: 17/204,353

(22) Filed: Mar. 17, 2021

(65) Prior Publication Data
US 2021/0296663 A1  Sep. 23, 2021

(30) Foreign Application Priority Data

Mar. 18, 2020 (JP) .............................. JP2020-047968
Sep. 17, 2020 (JP) .............................. JP2020-156319

(51) Int. Cl.

| | |
|---|---|
| *H01M 8/00* | (2016.01) |
| *B29C 53/00* | (2006.01) |
| *B32B 27/00* | (2006.01) |
| *H01M 8/0273* | (2016.01) |
| *B32B 27/08* | (2006.01) |
| *H01M 8/1004* | (2016.01) |

(Continued)

(52) U.S. Cl.
CPC ........... *H01M 8/0273* (2013.01); *B29C 53/04* (2013.01); *B32B 27/08* (2013.01); *H01M 8/1004* (2013.01); *B29C 2793/0027* (2013.01); *B32B 2457/18* (2013.01); *H01M 2008/1095* (2013.01)

(58) Field of Classification Search
CPC .......... H01M 8/00; H01M 8/02; H01M 8/027; H01M 8/0273; H01M 8/10; H01M 8/1004; B29C 53/00; B29C 53/04; B29C 2793/00; B29C 2793/002; B29C 2793/0027; B32B 27/00; B32B 27/08
See application file for complete search history.

(56) References Cited

U.S. PATENT DOCUMENTS

| | | | |
|---|---|---|---|
| 10,476,086 B2 * | 11/2019 | Terada ................ | H01M 8/1004 |
| 2018/0166707 A1 * | 6/2018 | Ohmori ............... | H01M 8/0273 |
| 2019/0245231 A1 * | 8/2019 | Sousa ................. | H01M 8/0286 |

FOREIGN PATENT DOCUMENTS

| | | | |
|---|---|---|---|
| JP | 2013-098155 A | 5/2013 | |
| JP | 2017-162640 A | 9/2017 | |

(Continued)

*Primary Examiner* — Jacob T Minskey
*Assistant Examiner* — Matthew Hoover
(74) *Attorney, Agent, or Firm* — Carrier Shende & Associates, P.C.; Joseph P. Carrier; Fulchand P. Shende

(57) ABSTRACT

In a method of producing a resin frame member for a fuel cell, a processing die is used. The method includes a processing step of moving an upper die toward a lower die to thereby form an inclined surface on each of side parts of a resin film. In the processing step, shearing is performed while maintaining a predetermined clearance between the lower processing section and the upper processing section and in a state where each of the side parts is at least partially positioned at a cutout so that each of the side parts is inclined downward toward the inside. The cutout is formed by cutting off an edge part of a placement surface that is positioned on the lower processing section side.

8 Claims, 14 Drawing Sheets

(51) Int. Cl.
B29C 53/04 (2006.01)
H01M 8/10 (2016.01)

(56) References Cited

FOREIGN PATENT DOCUMENTS

| JP | 2017-174650 A | 9/2017 |
| JP | 2018-097917 A | 6/2018 |

* cited by examiner

FIG. 1

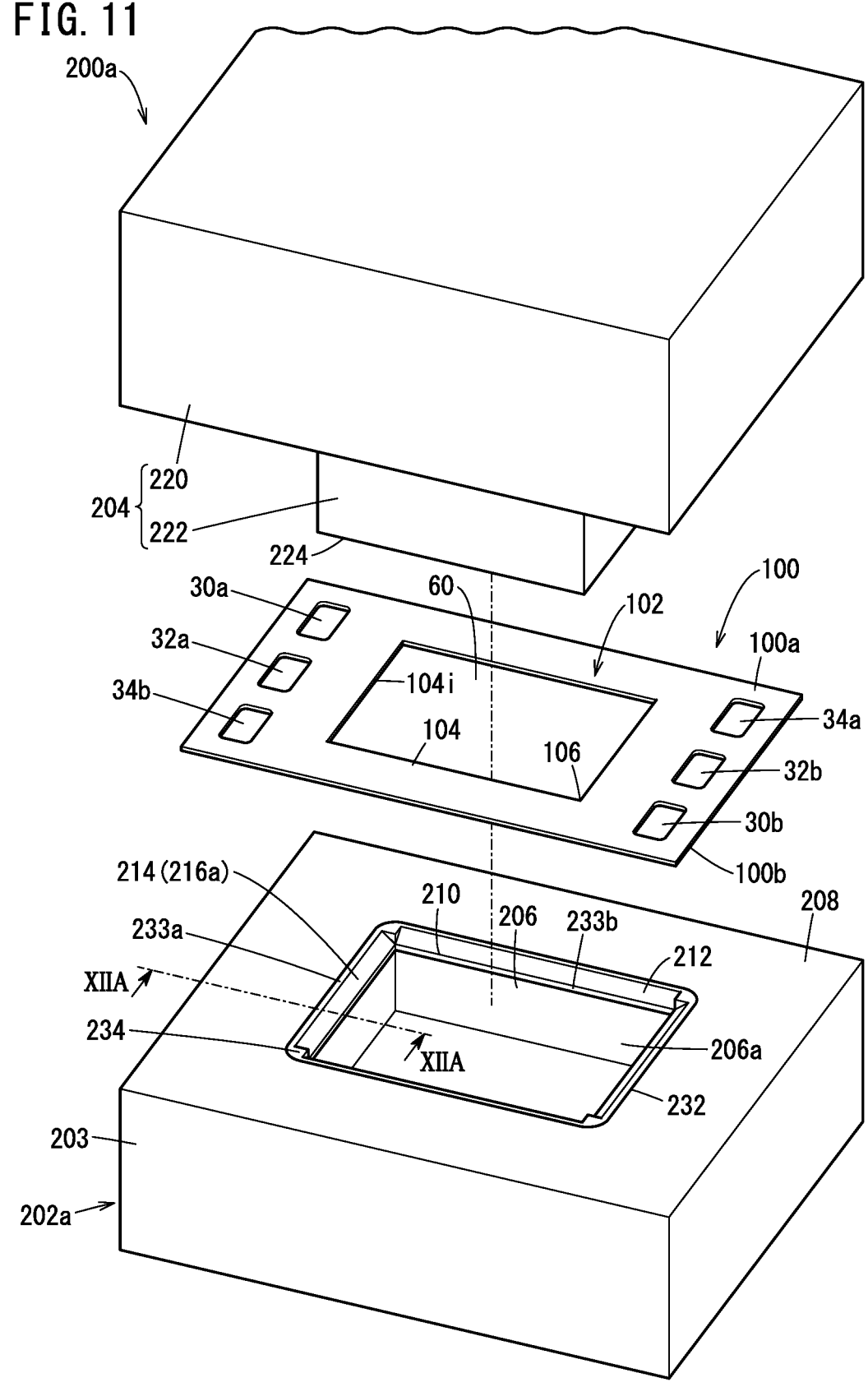

METHOD OF PRODUCING RESIN FRAME MEMBER FOR FUEL CELL AND PROCESSING DIE

CROSS-REFERENCE TO RELATED APPLICATIONS

This application is based upon and claims the benefit of priority from Japanese Patent Applications No. 2020-047968 filed on Mar. 18, 2020 and No. 2020-156319 filed on Sep. 17, 2020, the contents all of which are incorporated herein by reference.

BACKGROUND OF THE INVENTION

Field of the Invention

The present invention relates to a method of producing a resin frame member for a fuel cell and a processing die.

Description of the Related Art

For example, a power generation cell is formed by sandwiching a resin frame equipped membrane electrode assembly (resin frame equipped MEA) between a pair of separators. The resin frame equipped MEA includes a membrane electrode assembly (MEA) and a quadrangular annular resin frame member provided on an outer peripheral portion of the MEA. The MEA includes an electrolyte membrane, an anode provided on one surface of the electrolyte membrane, and a cathode provided on the other surface of the electrolyte membrane.

In the state where an inner peripheral end of the resin frame member is provided around the outer peripheral portion of the MEA, and disposed between an outer peripheral portion of the anode and an outer peripheral portion of the cathode, the inner peripheral end of the resin frame member is joined to the electrolyte membrane. In the resin frame member, in the case where the cross section taken along the thickness direction of the inner peripheral end has a quadrangular shape, a gap (portion where the electrolyte membrane and the electrode are spaced from each other) is formed inside the inner peripheral end of the resin frame member. In the resin frame equipped MEA, a gap formed inside the inner peripheral end of the resin frame member is an area where no power generation is performed. Therefore, the power generation efficiency of the power generation cell is lowered.

For example, Japanese Laid-Open Patent Publication No. 2018-097917 discloses a resin frame equipped MEA where a gap inside the inner peripheral end of the resin frame member is reduced. An inclined surface inclined inward from one surface to the other surface of the resin frame member is formed at an inner peripheral end of a resin frame member of this resin frame equipped MEA.

SUMMARY OF THE INVENTION

The present invention has been made in relation to the above technique, and an object of the present invention is to provide a fuel cell resin frame member and a method of producing processing die in which it is possible to form an inclined surface efficiently.

According to a first aspect of the present invention, a method of producing a resin frame member for a fuel cell is provided. The resin frame member is provided on an outer peripheral portion of a membrane electrode assembly. The method is performed by forming an inclined surface on each of side parts of an inner peripheral end of a resin film, the inner peripheral end surrounding a quadrangular opening formed at the center of the resin film. The method includes a placing step of placing the resin film on a placement surface of a lower die, and a processing step of, after the placing step, moving an upper die toward the lower die and shearing each of the side parts by a lower processing section of the lower die and an upper processing section of the upper die, to thereby form the inclined surface on each of the side parts. In the processing step, the shearing is performed while maintaining a predetermined clearance between the lower processing section and the upper processing section and in a state where each of the side parts is at least partially positioned at a cutout so that each of the side parts is inclined downward toward the inside, the cutout being formed by cutting off an edge part of the placement surface that is positioned on a side closer to the lower processing section.

According to a second aspect of the present invention, a processing die used in the method of producing the resin frame member for the fuel cell is provided. The processing die includes the lower die and the upper die disposed to face each other in a manner that the lower die and the upper die are movable close to and away from each other, wherein an upper surface of the lower die includes: a quadrangular insertion opening; the placement surface on which the resin film is placed and positioned so as to surround the insertion opening; the lower processing section having a quadrangular annular shape and extending along an outer periphery of the insertion opening; and the cutout formed by cutting off an edge part of the placement surface that is positioned on a side closer to the lower processing section, and wherein the upper die includes a punch provided with the upper processing section having a quadrangular shape, the punch being configured to be insertable into the insertion opening; and the lower processing section and the upper processing section are configured to shear each of the side parts in a state where the clearance is maintained between the lower processing section and the upper processing section when the upper die is moved toward the lower die.

In the present invention, while maintaining the predetermined clearance between the lower processing section and the upper processing section, in the state where each of the side parts is at least partially positioned at the cutout of the lower die so that each of the side parts is inclined downward toward the inside, it is possible to shear each of the side parts. In this manner, the cutting surface of each of the side parts cut by the upper processing section and the lower processing section becomes an inclined surface inclined from the thickness direction of the resin frame member. Therefore, it is possible to form the inclined surface efficiently.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is an exploded perspective view with partial omission showing a fuel cell stack having a resin frame member obtained by a method of producing a resin frame member for a fuel cell according to an embodiment of the present invention;

FIG. 11 is a perspective view showing a processing die and a resin film according to a modified embodiment;

DESCRIPTION OF THE PREFERRED EMBODIMENTS

Hereinafter, a preferred embodiment of a method of producing a resin frame member for a fuel cell and a processing die according to the present invention will be described with reference to the accompanying drawings.

Figure 1:
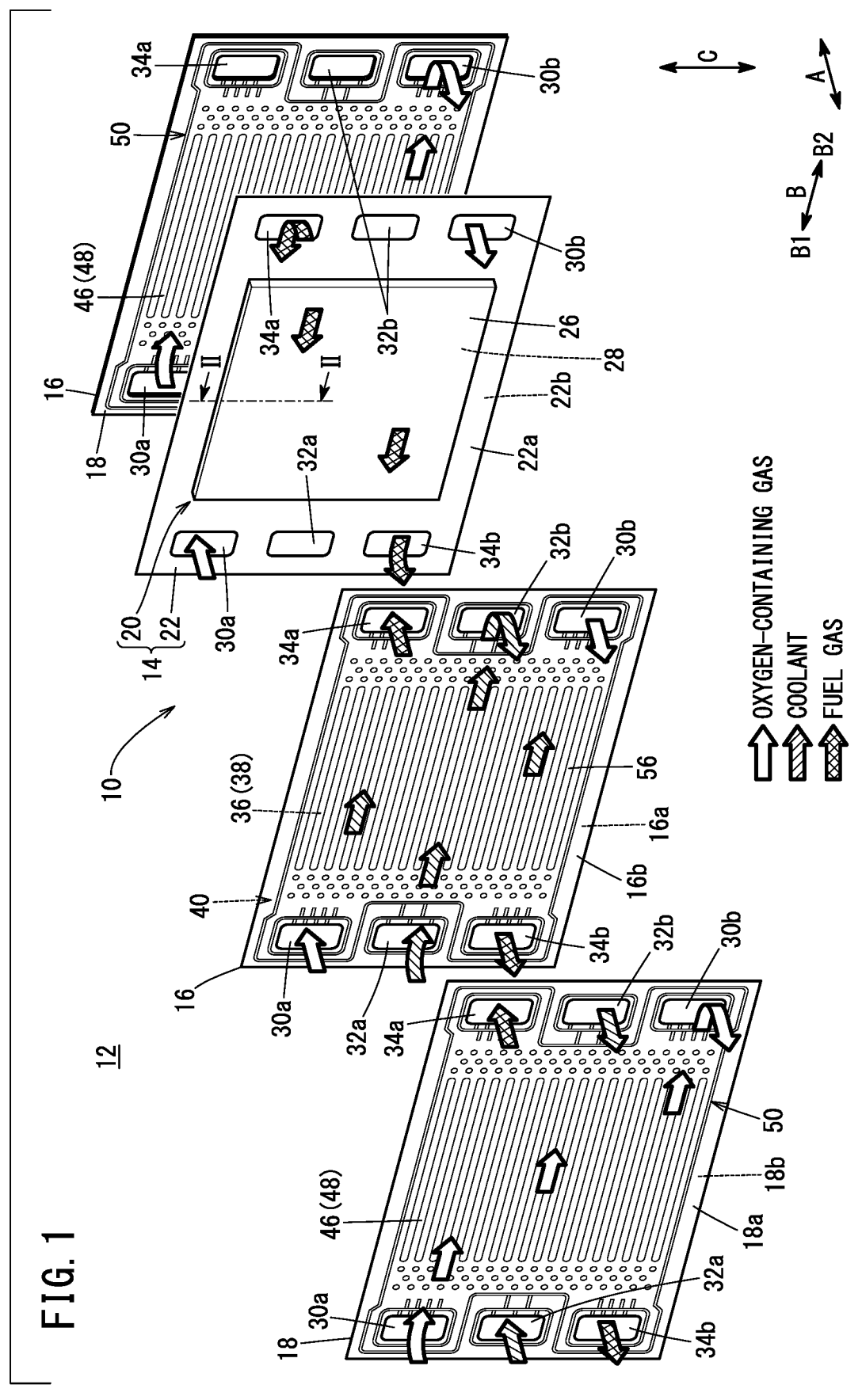
Figure 2:
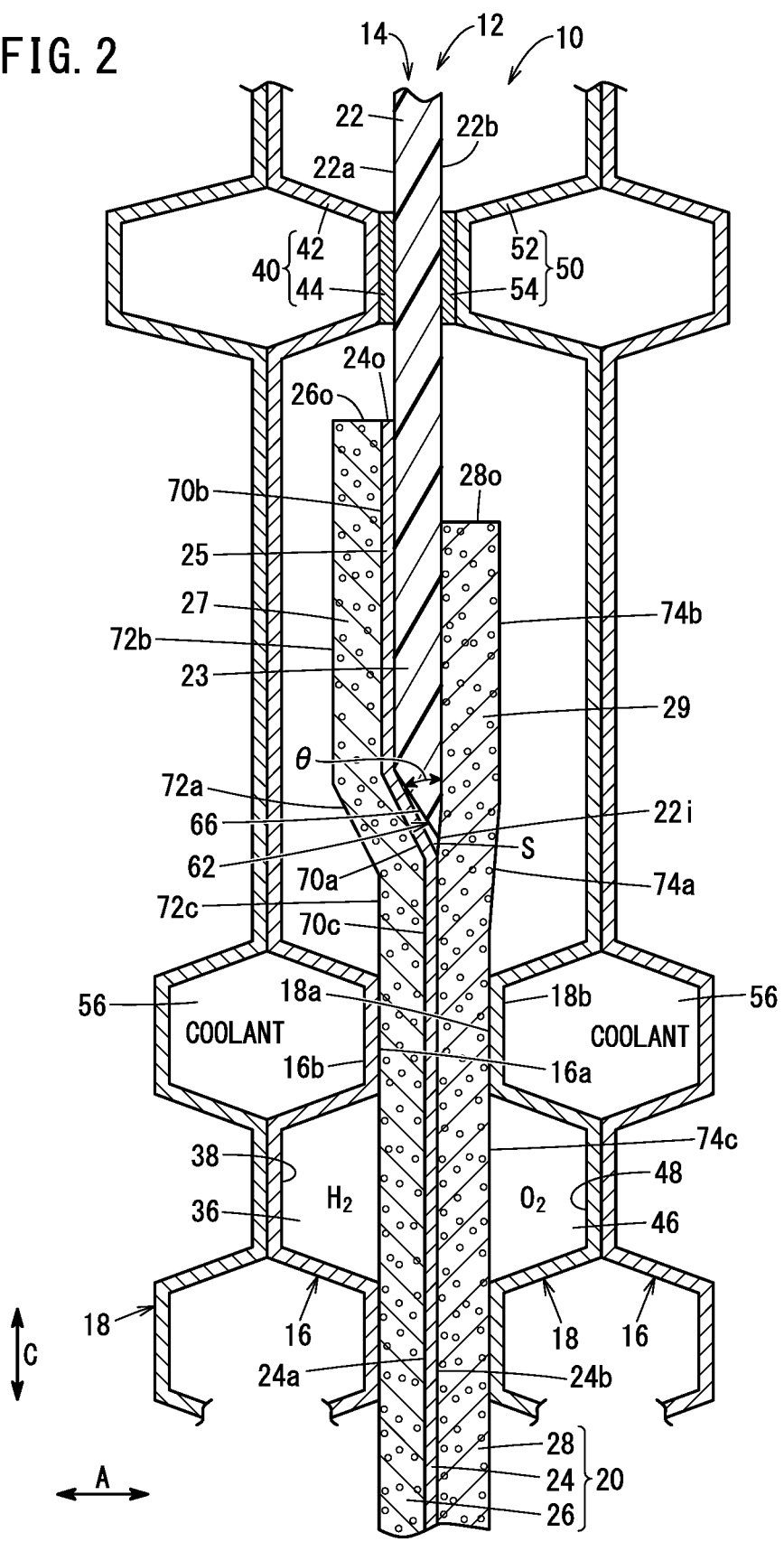
FIG. 2 is a cross sectional view taken along a line II-II in FIG. 1.

As shown in FIGS. 1 and 2, a plurality of power generation cells 10 are stacked together in a thickness direction of the power generation cells 10 (direction indicated by an arrow A) to form a fuel cell stack 12. For example, the fuel cell stack 12 is mounted in a fuel cell electric vehicle (not shown) as an in-vehicle fuel cell stack. It should be noted that the stacking direction of the plurality of the power generation cells 10 may be oriented in either a horizontal direction, or the gravity direction.

In FIG. 1, the power generation cell 10 has a laterally elongated rectangular shape. It should be noted that the power generation cell 10 may have a longitudinally elongated rectangular shape. As shown in FIGS. 1 and 2, the power generation cell 10 includes a resin frame equipped membrane electrode assembly (hereinafter referred to as the "resin frame equipped MEA 14"), and a first separator 16 and a second separator 18 provided on both sides of the resin frame equipped MEA 14, respectively. The resin frame equipped MEA 14 includes a membrane electrode assembly (hereinafter referred to as the "MEA 20"), and a resin frame member 22 (resin frame part) provided on an outer peripheral portion of the MEA 20.

In FIG. 2, the MEA 20 includes an electrolyte membrane 24, an anode 26 (first electrode) provided on one surface 24a of the electrolyte membrane 24, and a cathode 28 (second electrode) provided on the other surface 24b of the electrolyte membrane 24. For example, the electrolyte membrane 24 is a solid polymer electrolyte membrane (cation ion exchange membrane). For example, the sold polymer electrolyte membrane is a thin membrane of perfluorosulfonic acid containing water. A fluorine based electrolyte may be used as the electrolyte membrane 24. Alternatively, an HC (hydrocarbon) based electrolyte may be used as the electrolyte membrane 24. The electrolyte membrane 24 is held between the anode 26 and the cathode 28.

Though not shown in details, the anode 26 includes a first electrode catalyst layer joined to one surface 24a of the electrolyte membrane 24, and a first gas diffusion layer stacked on the first electrode catalyst layer. The first electrode catalyst layer is formed by depositing porous carbon particles uniformly on the surface of the first gas diffusion layer, and platinum alloy is supported on surfaces of the carbon particles.

The cathode 28 includes a second electrode catalyst layer joined to the other surface 24b of the electrolyte membrane 24, and a second gas diffusion layer stacked on the second electrode catalyst layer. The second electrode catalyst layer is formed by depositing porous carbon particles uniformly on the surface of the second gas diffusion layer, and platinum alloy is supported on surfaces of the carbon particles. Each of the first gas diffusion layer and the second gas diffusion layer comprises a carbon paper, a carbon cloth, etc.

The surface size (outer size) of the anode 26 is larger than the surface size of the cathode 28. The surface size of the electrolyte membrane 24 is the same as the surface size of the anode 26. The outer peripheral end 26o of the anode 26 is positioned outside the outer peripheral end 28o of the cathode 28. In the surface direction of the electrolyte membrane 24 (in the direction indicated by the arrow C in FIG. 2), the outer peripheral end 24o of the electrolyte membrane 24 is present at the same position as the outer peripheral end 26o of the anode 26.

The surface size of the anode 26 may be smaller than the surface size of the cathode 28. In this case, the outer peripheral end 26o of the anode 26 is positioned inside the outer peripheral end 28o of the cathode 28. The surface size of the electrolyte membrane 24 may be the same as the surface size of the anode 26. The surface size of the electrolyte membrane 24 may be the same as the surface size of the cathode 28. The surface size of the anode 26 may be the same as the surface size of the cathode 28. In this case, in the surface direction of the electrolyte membrane 24, the outer peripheral end 24o of the electrolyte membrane 24, the outer peripheral end 26o of the anode 26 and the outer peripheral end 28o of the cathode 28 are present at the same position.

The resin frame member 22 is a single frame shaped sheet provided around the outer peripheral portion of the MEA 20. The resin frame member 22 is an electrically insulating member. Examples of materials of the resin frame member 22 include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin. The details of the resin frame member 22 will be described later.

In FIG. 1, each of the first separator 16 and the second separator 18 has a rectangular shape (quadrangular shape). Each of the first separator 16 and the second separator 18 is formed by press forming of a metal thin plate to have a corrugated shape in cross section and a wavy shape on the surface. For example, the metal plate is a steel plate, a stainless steel plate, an aluminum plate, a plated steel plate, or a metal plate having an anti-corrosive surface by surface treatment. It should be noted that each of the first separator 16 and the second separator 18 may be made of carbon, etc. In the state where the first separator 16 and the second separator 18 are stacked together, the outer peripheral portions of the first separator 16 and the second separator 18 are joined together by welding, brazing, crimping, etc.

At one end of the power generation cell 10 in the long side direction B (end in the direction indicated by the arrow B1), an oxygen-containing gas supply passage 30*a*, a coolant supply passage 32*a*, and a fuel gas discharge passage 34*b* are arranged in the short side direction (direction indicated by the arrow C) of the power generation cells 10. An oxygen-containing gas is supplied through the oxygen-containing gas supply passage 30*a* in the direction indicated by the arrow A. A coolant (e.g., pure water, ethylene glycol, oil) is supplied through the coolant supply passage 32*a* in the direction indicated by the arrow A. A fuel gas (e.g., hydrogen-containing gas) is discharged through the fuel gas discharge passage 34*b* in the direction indicated by the arrow A.

At the other end of the power generation cell 10 in the direction indicated by the arrow B (end in the direction indicated by the arrow B2), a fuel gas supply passage 34*a*, a coolant discharge passage 32*b*, and an oxygen-containing gas discharge passage 30*b* are arranged in the direction indicated by the arrow C. The fuel gas is supplied through the fuel gas supply passage 34*a* in the direction indicated by the arrow A. The coolant is discharged through the coolant discharge passage 32*b* in the direction indicated by the arrow A. The oxygen-containing gas is discharged through the oxygen-containing gas discharge passage 30*b* in the direction indicated by the arrow A.

The sizes, the positions, the shapes, and the numbers of the oxygen-containing gas supply passage 30*a*, the oxygen-containing gas discharge passage 30*b*, the fuel gas supply passage 34*a*, the fuel gas discharge passage 34*b*, the coolant supply passage 32*a*, and the coolant discharge passage 32*b* are not limited to the embodiment of the present invention, and may be determined as necessary depending on the required specification.

As shown in FIGS. 1 and 2, the first separator 16 has a fuel gas flow field 36 on its surface 16*a* facing the MEA 20. The fuel gas flow field 36 is connected to the fuel gas supply passage 34*a* and the fuel gas discharge passage 34*b*. The fuel gas flow field 36 includes a plurality of fuel gas flow grooves 38 extending in the direction indicated by the arrow B. Each of the fuel gas flow grooves 38 may extend in a wavy pattern in the direction indicated by the arrow B.

In FIG. 1, a first seal 40 is provided on the first separator 16, for preventing leakage of fluid (the fuel gas, the oxygen-containing gas, and the coolant) from positions between the resin frame equipped MEA 14 and the first separator 16. The first seal 40 is formed along the outer peripheral portion of the first separator 16, and provided around the fluid passages (oxygen-containing gas supply passage 30*a*, etc.). The first seal 40 extends straight as viewed in the separator thickness direction (direction indicated by the arrow A). It should be noted that the first seal 40 may extend in a wavy pattern as viewed in the separator thickness direction.

In FIG. 2, the first seal 40 includes a first metal bead 42 formed integrally with the first separator 16, and a first resin member 44 provided on the first metal bead 42. The first metal bead 42 protrudes from the first separator 16 toward the resin frame member 22. The first metal bead 42 has a trapezoidal shape in lateral cross section which is tapered (narrowed) in a protruding direction in which the first metal bead 42 protrudes. The first resin member 44 is an elastic member fixed to the protruding end surface of the first metal bead 42 by printing or coating, etc. For example, polyester fiber may be used as the first resin member 44.

As shown in FIGS. 1 and 2, the second separator 18 has an oxygen-containing gas flow field 46 on its surface 18*a* facing the MEA 20. The oxygen-containing gas flow field 46 is connected to the oxygen-containing gas supply passage 30*a* and the oxygen-containing gas discharge passage 30*b*. The oxygen-containing gas flow field 46 includes a plurality of oxygen-containing gas flow grooves 48 extending in the direction indicated by the arrow B. Each of the oxygen-containing gas flow grooves 48 may extend in a wavy pattern in the direction indicated by the arrow B.

A second seal 50 is provided on the second separator 18, for preventing leakage of fluid (the fuel gas, the oxygen-containing gas, and the coolant) from positions between the resin frame equipped MEA 14 and the second separator 18. The second seal 50 is formed along the outer peripheral portion of the second separator 18, and provided around the fluid passages (oxygen-containing gas supply passage 30*a*, etc.). The second seal 50 extends straight as viewed in the separator thickness direction (direction indicated by the arrow A). It should be noted that the second seal 50 may extend in a wavy pattern as viewed in the separator thickness direction.

In FIG. 2, the second seal 50 includes a second metal bead 52 formed integrally with the second separator 18, and a second resin member 54 provided on the second metal bead 52. The second metal bead 52 protrudes from the second separator 18 toward the resin frame member 22. The second metal bead 52 has a trapezoidal shape in lateral cross section which is tapered (narrowed) in a protruding direction in which the second metal bead 52 protrudes. The second resin member 54 is an elastic member fixed to the protruding end surface of the second metal bead 52 by printing or coating, etc. For example, polyester fiber may be used as the second resin member 54.

The first seal 40 and the second seal 50 are disposed in a manner that the first seal 40 and the second seal 50 are overlapped with each other as viewed in the separator thickness direction. Therefore, in the state where a tightening load (compression load) is applied to the fuel cell stack 12, each of the first metal bead 42 and the second metal bead 52 is elastically deformed (deformed by compression). Further, in this state, the protruding end surface (the first resin member 44) of the first seal 40 contacts one surface 22*a* of the resin frame member 22 in an air-tight and liquid-tight manner, and the protruding end surface (second resin member 54) of the second seal 50 contacts the other surface 22*b* of the resin frame member 22 in an air-tight and liquid-tight manner.

The first resin member 44 may be provided on one surface 22*a* of the resin frame member 22 instead of the first metal bead 42. The second resin member 54 may be provided on the other surface 22*b* of the resin frame member 22 instead of the second metal bead 52. Further, at least one of the first resin member 44 and the second resin member 54 may be omitted. The first seal 40 and the second seal 50 may be in the form of elastic rubber seal members, instead of the metal bead seals as described above.

In FIGS. 1 and 2, a coolant flow field 56 is provided between a surface 16*b* of the first separator 16 and a surface 18*b* of the second separator 18. The coolant flow field 56 is connected to the coolant supply passage 32*a* and the coolant discharge passage 32b. The coolant flow field 56 is formed on the back surface of the oxygen-containing gas flow field 46 and the back surface of the fuel gas flow field 36.

Figure 3A:
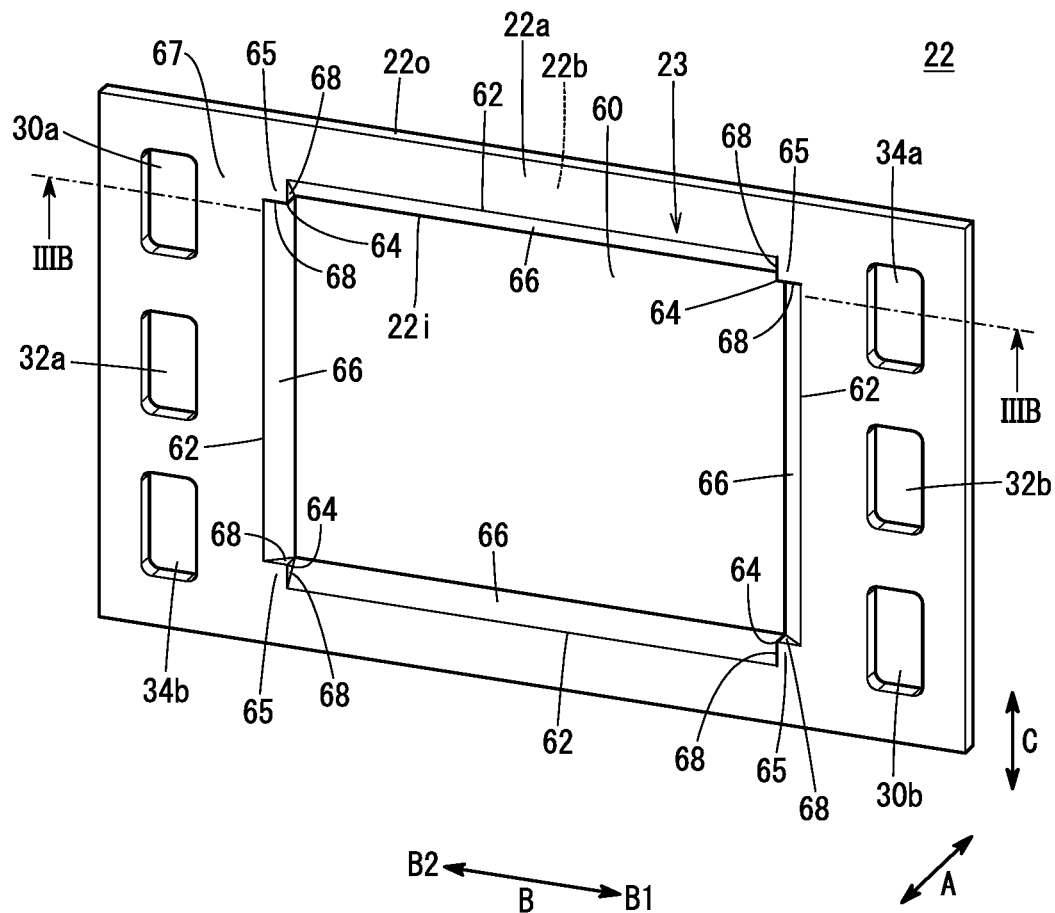
FIG. 3A is a perspective view showing a resin frame member in FIG. 2.

As shown in FIGS. 1 and 3A, the resin frame member 22 is formed in a quadrangular annular shape. That is, in FIG. 3A, a quadrangular opening 60 is formed at the central portion of the resin frame member 22. Therefore, as shown in FIGS. 1 to 3A, the inner peripheral end 23 of the resin frame member 22 is formed in a quadrangular annular shape around the outer peripheral portion of the MEA 20. It should be noted that the inner peripheral end 23 of the resin frame member 22 is a portion forming an inner end 22i of the resin frame member 22 and an area in the vicinity of the inner end 22i of the resin frame member 22.

As shown in FIG. 2, the inner peripheral end 23 of the resin frame member 22 is disposed between an outer peripheral portion 27 of the anode 26 and an outer peripheral portion 29 of the cathode 28. Specifically, the inner peripheral end 23 of the resin frame member 22 is held between an outer peripheral portion 25 of the electrolyte membrane 24 and the outer peripheral portion 29 of the cathode 28. It should be noted that the inner peripheral end 23 of the resin frame member 22 may be held between the outer peripheral portion 25 of the electrolyte membrane 24 and the outer peripheral portion 27 of the anode 26.

In FIG. 3A, the inner peripheral end 23 of the resin frame member 22 includes four straight side parts 62 and four corner parts 64. As shown in FIGS. 2 and 3A, each of the side parts 62 is narrowed toward the inside of the resin frame member 22. Stated otherwise, the thickness (size in the direction indicated by the arrow A) of each of the side parts 62 is decreased toward the inside of the resin frame member 22. Each of the side parts 62 has a triangular shape in lateral cross section. That is, each of the side parts 62 includes an inclined surface 66 which is inclined from one surface 22a to the other surface 22b of the resin frame member 22, and a pair of side surfaces 68 coupled to both sides of the inclined surface 66 (see FIG. 3A). The inclined surface 66 is a flat surface.

As shown in FIG. 2, the inclination angle θ of the inclined surface 66 (angle generated between the other surface 22b of the resin frame member 22 and the inclined surface 66) is, for example, preferably, not more than 45°, more preferably, not less than 15° and not more than 30°, and still more preferably, about 20°. The inclination angle θ can be determined as necessary. The four side parts 62 have the same inclination angle θ. It should be noted that the four side parts 62 may have different inclination angles θ.

The inclined surface 66 extends over the entire length of each of side parts 62 (see FIG. 3A). It should be noted that the inclined surface 66 may be provided only in a portion of each of the side parts 62 in which the side parts 62 extend. The inclined surface 66 faces the other surface 24b of the electrolyte membrane 24. Stated otherwise, the inclined surface 66 is positioned close to, or contacts the other surface 24b of the electrolyte membrane 24. The thickness of each of the side parts 62 is reduced inward. Therefore, the gap S formed inside each of the side parts 62 is small in comparison with the case where the inclined surface 66 is not formed in each of the side parts 62 (in the case where each of the side parts 62 has a quadrangular shape in lateral cross section).

In FIG. 3A, each of the side surfaces 68 is coupled to an end of the inclined surface 66 in which the inclined surface 66 extends. Stated otherwise, each of the side surfaces 68 is positioned at an end of each of the side parts 62 in the direction in which the side parts 62 extend. The corner part 64 is formed by the side surfaces 68 that are adjacent to each other. The angle between two side surfaces 68 forming the corner part 64 is about 90°. Each of the side surfaces 68 has a triangular shape. Each of the corner parts 64 protrudes toward one surface of the resin frame member 22 from the inclined surface 66. In the side part 62 and the corner part 64 of the inner peripheral end 23 that are adjacent to each other, a step (side surface 68) is formed between a portion (first plane surface part 65) at the corner part 64 and the inclined surface 66 of one surface 22a of the resin frame member 22. The first plane surface part 65 of the corner part 64 and the portion (second plane surface part 67) of one surface 22a of the resin frame member 22 positioned outside the inner peripheral end 23 are in the same plane surface.

Figure 3B:
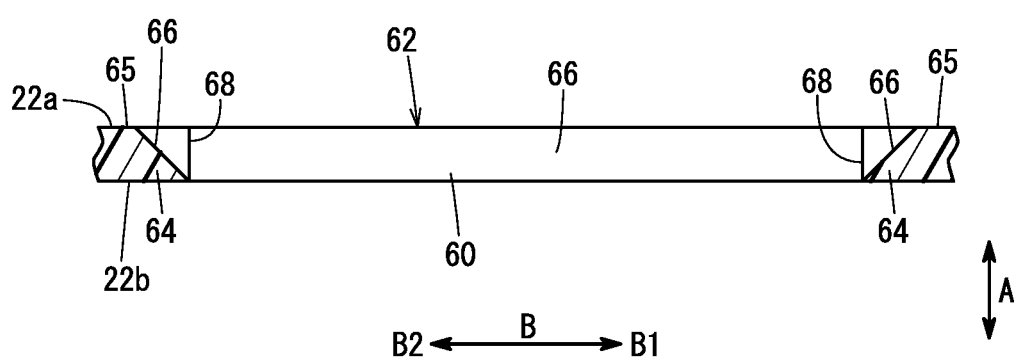
FIG. 3B is a cross sectional view taken along a line IIIB-IIIB in FIG. 3A.

As shown in FIGS. 3A and 3B, each of the corner parts 64 has substantially constant thickness toward the inside of the resin frame member 22, up to the inner end 22i of the resin frame member 22. Each of the corner parts 64 has a quadrangular shape (rectangular shape) in lateral cross section (see FIG. 3B). The thickness of each of the corner parts 64 is larger than the thickness of a portion of the inner peripheral end 23 where the inclined surface (slope) 66 is formed. In each of corner parts 64, one surface 22a of the resin frame member 22 and the other surface 22b of the resin frame member 22 extend in parallel to each other. That is, no inclined surface 66 is formed in each of the corner parts 64.

As shown in FIG. 2, a first inclined area 70a is formed in the outer peripheral portion 25 of the electrolyte membrane 24, in a portion facing the inclined surface 66 of the resin frame member 22. In the electrolyte membrane 24, the surface 70b closer to the anode 26 which is positioned outside the first inclined area 70a is spaced from the cathode 28, in comparison with the surface 70c closer to the anode 26 which is positioned inside the first inclined area 70a.

A second inclined area 72a is formed in the outer peripheral portion 27 of the anode 26 in a portion facing the first inclined area 70a of the electrolyte membrane 24. The second inclined area 72a extends substantially in parallel to the first inclined area 70a. In the anode 26, the surface 72b closer to the first separator 16 positioned outside the second inclined area 72a is spaced from the cathode 28, in comparison with the surface 72c of the first separator 16 positioned inside the second inclined area 72a.

A third inclined area 74a is formed in the outer peripheral portion 29 of the cathode 28, at a position overlapped with the inclined surface 66 of the resin frame member 22, in the thickness direction (direction indicated by the arrow A) of the resin frame member 22. The third inclined area 74a is inclined toward the outer peripheral end 28o of the cathode 28, opposite to the side where the resin frame member 22 is positioned. In the cathode 28, the surface 74b of the second separator 18 positioned outside the third inclined area 74a is spaced from the anode 26 in comparison with the surface 74c closer to the second separator 18 positioned inside the third inclined area 74a.

Next, operation of the fuel cell stack 12 including the power generation cell 10 according to the embodiment of the present invention will be described below.

As shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, ethylene glycol, or oil is supplied to the coolant supply passage 32a.

Therefore, the oxygen-containing gas flows from the oxygen-containing gas supply passage 30a into the oxygen-containing gas flow field 46 of the second separator 18. The oxygen-containing gas moves in the direction indicated by the arrow B, and the oxygen-containing gas is supplied to the cathode 28 of the MEA 20. In the meanwhile, the fuel gas flows from the fuel gas supply passage 34a into the fuel gas flow field 36 of the first separator 16. The fuel gas flows along the fuel gas flow field 36 in the direction indicated by the arrow B, and the fuel gas is supplied to the anode 26 of the MEA 20.

Thus, in each of the MEAs 20, the oxygen-containing gas supplied to the cathode 28 and the fuel gas supplied to the anode 26 are consumed in the electrochemical reactions to perform power generation.

Then, in FIG. 1, the oxygen-containing gas supplied to the cathode 28 is discharged along the oxygen-containing gas discharge passage 30b in the direction indicated by the arrow A. Likewise, the fuel gas supplied to the anode 26 is consumed at the anode 26, and the fuel gas is discharged along the fuel gas discharge passage 34b in the direction indicated by the arrow A.

Further, the coolant supplied to the coolant supply passage 32a flows into the coolant flow field 56 between the first separator 16 and the second separator 18, and thereafter, flows in the direction indicated by the arrow B. After the coolant cools the MEA 20, the coolant is discharged from the coolant discharge passage 32b.

Next, a method of producing the resin frame equipped MEA 14 according to the embodiment of the present invention will be described below.

Figure 4:
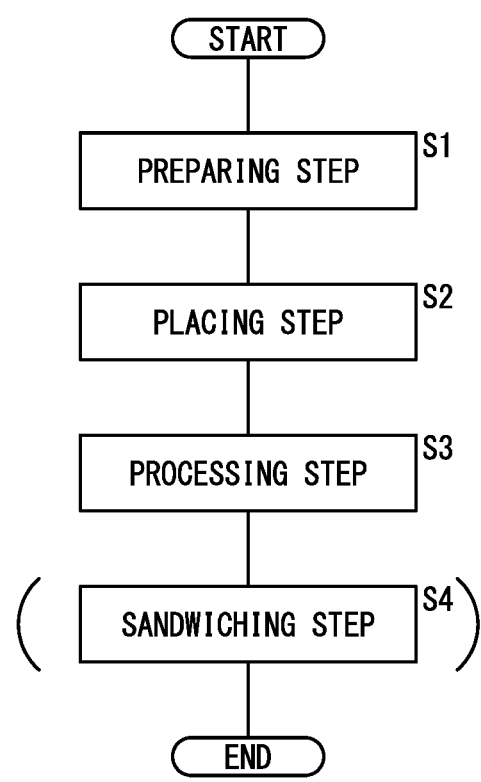
FIG. 4 is a flow chart showing a method of producing the resin frame member in FIG. 3A.
Figure 5:
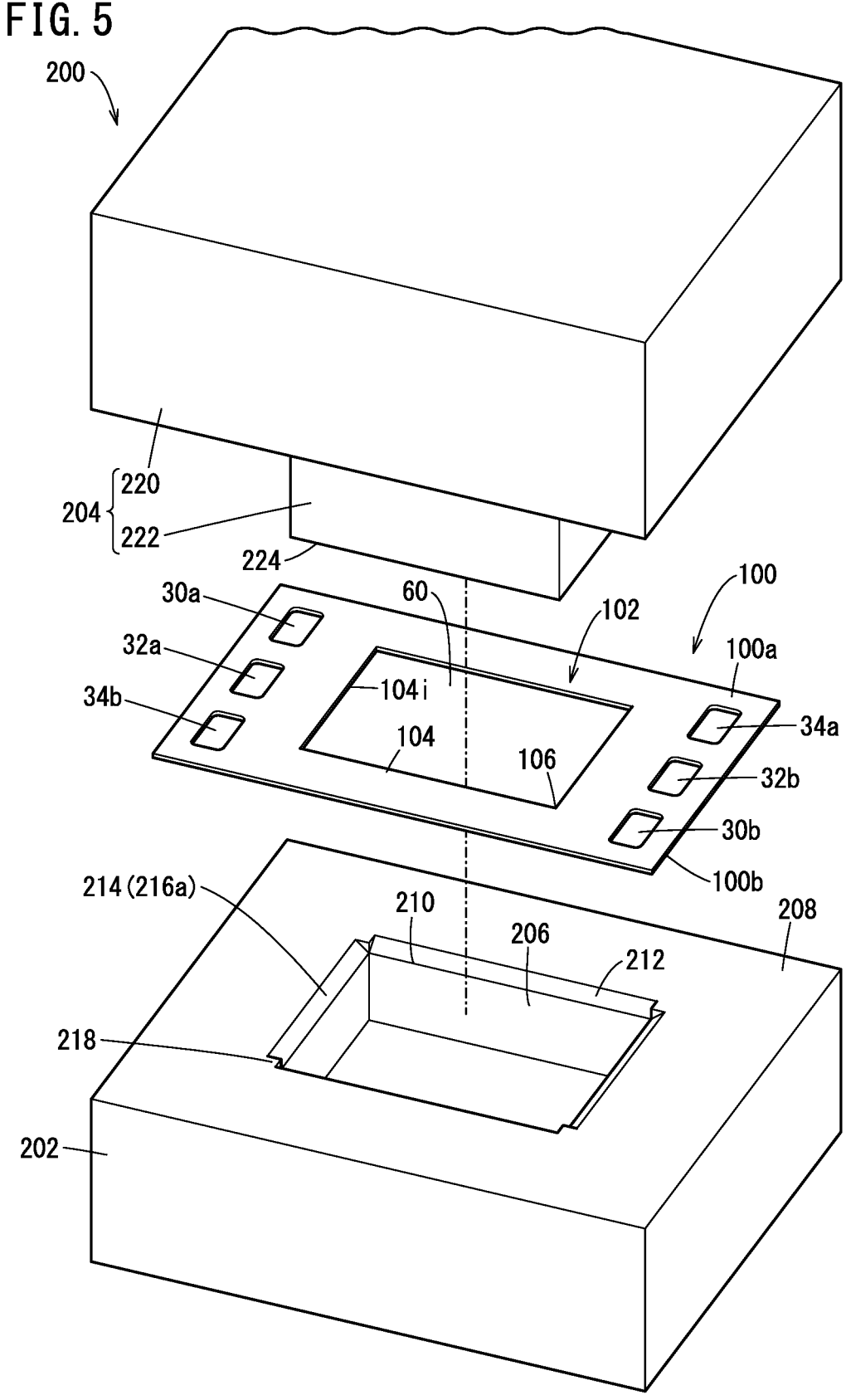
FIG. 5 is a perspective view showing a processing die for producing the resin frame member and a resin film.
Figure 6:
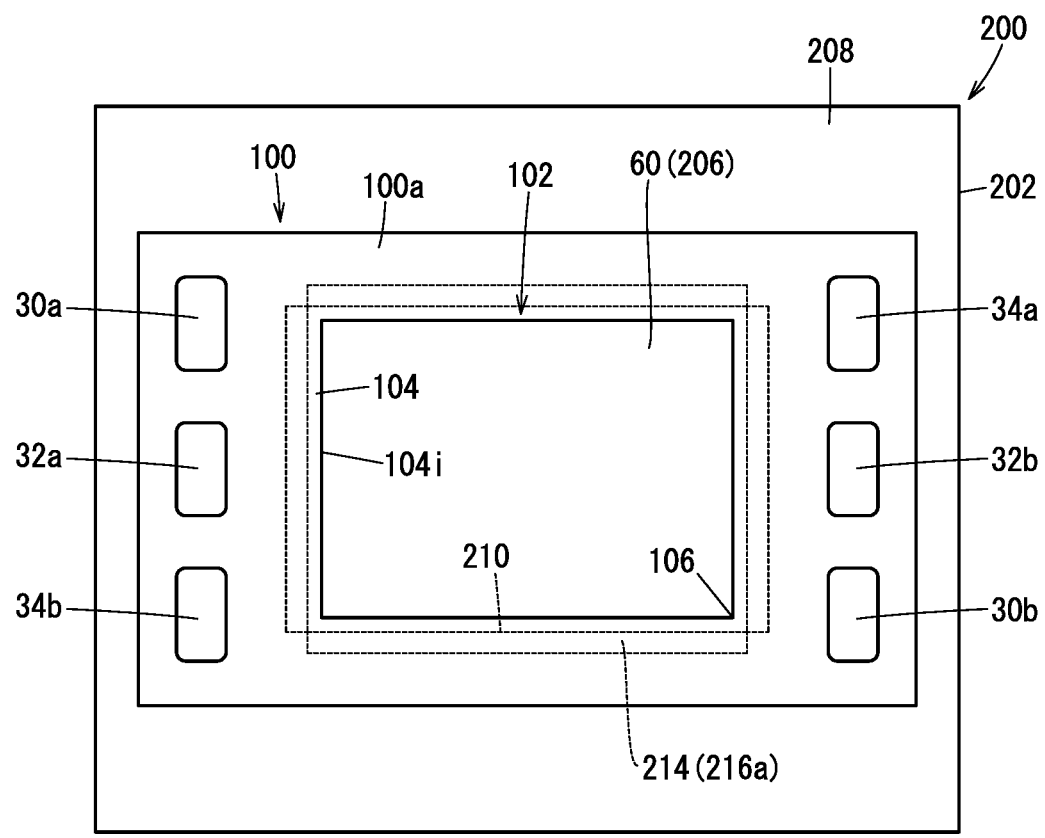
FIG. 6 is a view illustrating a placing step.

Firstly, the resin frame member 22 as described above is produced. Specifically, as shown in FIG. 4, a method of producing the resin frame member 22 includes a preparing step, a placing step, a processing step, and a sandwiching step. As shown in FIG. 5, the resin frame member 22 is formed by processing a resin film 100 using a processing die 200.

As shown in FIG. 5, the processing die 200 includes a lower die 202 and an upper die 204 which are disposed to face each other in a manner that the lower die 202 and the upper die 204 can move close to and away from each other. The lower die 202 is a die having an insertion opening 206 (opening) on an upper surface of the lower die 202. The lower die 202 has a quadrangular annular shape as viewed from above. The upper surface of the lower die 202 includes a quadrangular annular placement surface 208 on which the resin film 100 can be placed, and further includes a lower processing section 210 (lower blade) positioned at an inner end (inner edge) of the upper surface of the lower die 202 (the lower processing section 210 extends along the outer periphery of the insertion opening 206). Four cutouts (chamfered portions) 212 are provided on an inner peripheral edge parts (i.e., edge parts positioned on a side closer to the lower processing section 210, i.e., the lower processing section side) of the placement surface 208. The four cutouts 212 extend along the sides of the lower processing section 210, respectively. The cutout 212 is formed, for example, by C chamfering. In this case, preferably, the chamfered amount C of the C chamfering is set to be not less than 0.5 (C0.5) and not more than 2 (C2).

Stated otherwise, the upper surface of the lower die 202 includes four support surfaces 214 formed on a part thereof where the cutouts 212 are positioned. The four support surfaces 214 are inclined downward from the placement surface 208 toward the lower processing section 210. Each of the support surfaces 214 extends over the entire length of each of the sides of the lower processing section 210. Each of the support surfaces 214 is a flat surface 216a. The width and the inclination angle of each of the support surfaces 214 (angle formed between a line in parallel with the placement surface 208 and the inclined surface 66) are set as appropriate depending on the material, the thickness, etc. of the resin film 100. It should be noted that a corner part 218 having a quadrangular shape in lateral cross section is positioned between the adjacent support surfaces 214.

The upper die 204 includes an upper die body 220 and a punch 222. The upper die body 220 is provided movably in an upper/lower direction. The punch 222 protrudes downward from a lower surface of the upper die body 220. The punch 222 is formed to have a rectangular parallelepiped shape. When the upper die 204 is moved downward toward the lower die 202, the punch 222 is inserted into the insertion opening 206 of the lower die 202.

Figure 7A:
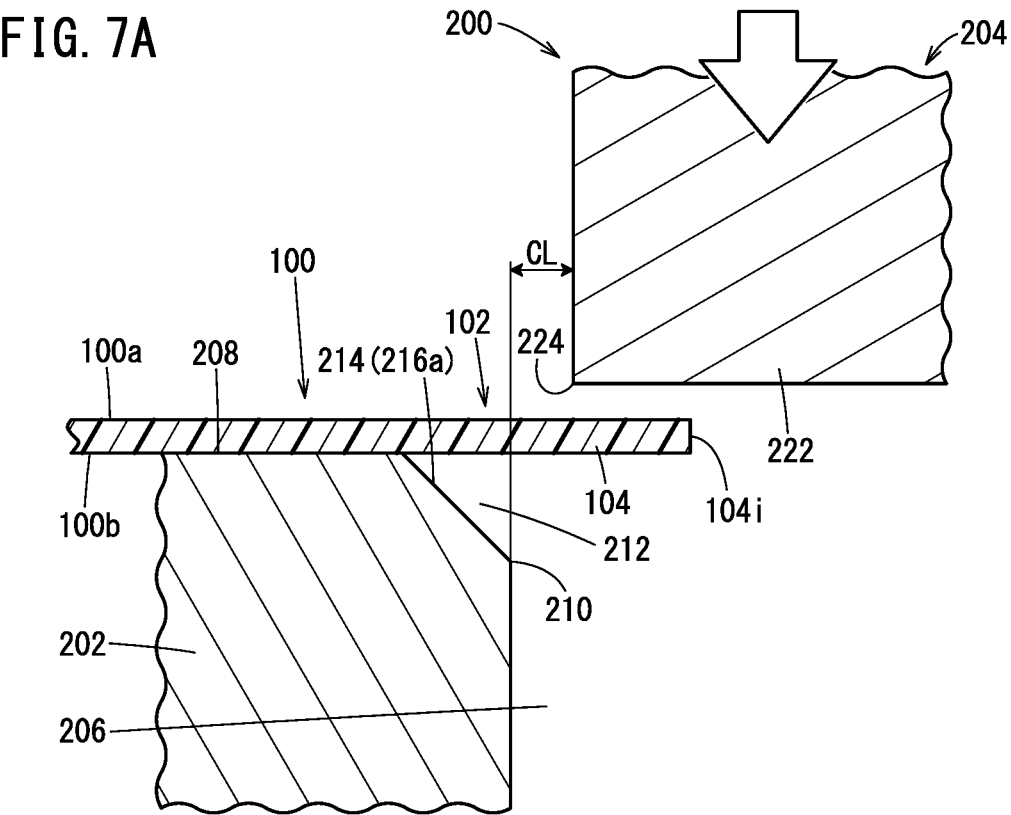
FIG. 7A is a first view illustrating a processing step.

A quadrangular upper processing section 224 (upper blade) is provided at an outer peripheral end of the protruding end surface of the punch 222. The size of the upper processing section 224 is slightly smaller than the lower processing section 210. That is, as shown in FIG. 7A, at the time of inserting the punch 222 into the insertion opening 206, a predetermined clearance CL is formed between the upper processing section 224 and the lower processing section 210. The clearance CL is configured to have a size in the range of not less than 10 μm and not more than 60 μm. The size of the clearance CL can be determined as necessary depending on the material, the thickness, etc. of the resin film 100.

In the method of producing the resin frame member 22, firstly the preparing step (step S1 in FIG. 4) is performed. In the preparing step, a quadrangular annular resin film 100 shown in FIG. 5 is produced. The resin film 100 is formed to have a laterally elongated rectangular shape. A quadrangular opening 60 is formed at the center of the resin film 100. That is, the resin film 100 has a quadrangular annular shape. An inner peripheral end 102 of the resin film 100 includes four side parts 104, and four corner parts 106.

At one end of the resin film 100 in the long side direction, the oxygen-containing gas supply passage 30a, the coolant supply passage 32a, and the fuel gas discharge passage 34b are formed. At the other end of the resin film 100 in the longitudinal direction, the fuel gas supply passage 34a, the coolant discharge passage 32b, and the oxygen-containing gas discharge passage 30b are formed.

When the preparing step is finished, the placing step (step S2 in FIG. 4) is performed. In the placing step, as shown in FIGS. 5 to 7A, in a state where one surface 100a of the resin film 100 is oriented upward, the other surface 100b of the resin film 100 is placed on the placement surface 208 of the lower die 202. It should be noted that the processing die 200 includes a positioning mechanism (not shown) for positioning the resin film 100 on the lower die 202. For example, the positioning mechanism is a knock pin provided on the lower die 202. In this case, the knock pin is inserted into a positioning hole (not shown) formed in the resin film 100. At this time, in FIG. 6, the center of the resin film 100 is positioned at the center of the upper surface of the lower die 202.

It should be noted that the size of the opening 60 of the resin film 100 is slightly smaller than the insertion opening 206 of the lower die 202. Therefore, the inner peripheral end 102 of the resin film 100 is positioned inside the lower processing section 210 of the lower die 202. Stated otherwise, each of the side parts 104 of the inner peripheral end 102 of the resin film 100 is at least partially positioned on the cutout 212 of the lower die 202 (see FIG. 7A). That is, the inner end 104i of each of the side parts 104 is positioned more inward than the lower processing section 210.

When the placing step is finished, the processing step (step S3 in FIG. 4) is performed. In the processing step, as shown in FIGS. 7A to 8A, the upper die 204 is moved toward the lower die 202 to thereby perform shearing of each of the side parts 104 of the inner peripheral end 102 of the resin film 100 by the lower processing section 210 and the upper processing section 224. As a result, the inclined surface 66 is formed on each of the side parts 104 of the resin film 100. At this time, one surface 100a of the resin film 100 may be pressed against the placement surface 208 by a pressing member (not shown).

Figure 7B:
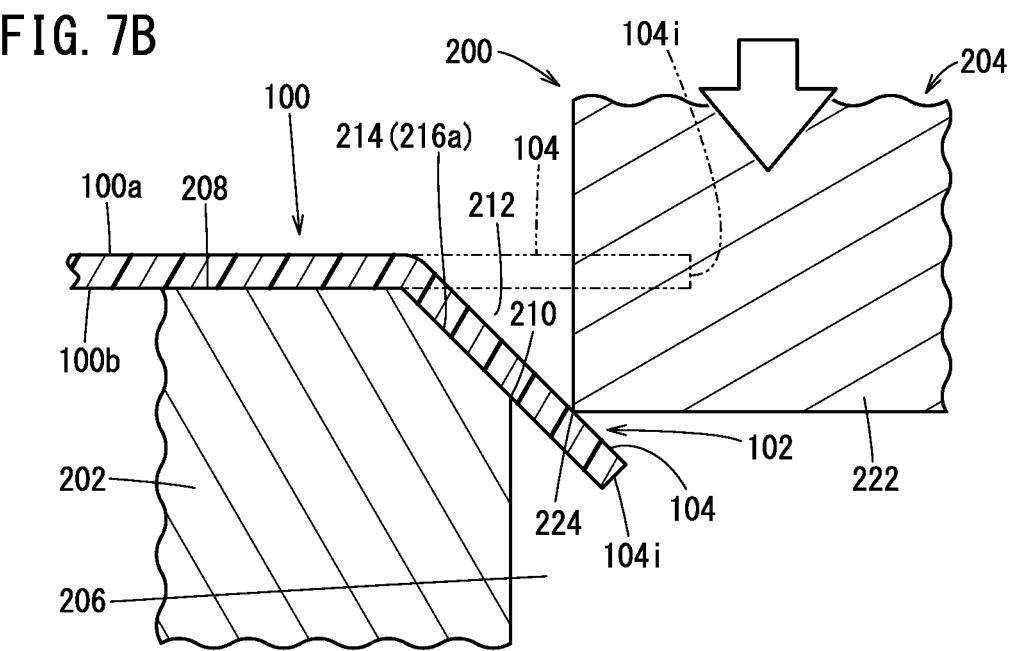
FIG. 7B is a second view illustrating the processing step.

When the upper die 204 is lowered, as shown in FIG. 7B, the upper processing section 224 contacts one surface 100a of the resin film 100, and the resin film 100 is pressed downward. At this time, the other surface 100b of the resin film 100 contacts the support surface 214, and contacts the lower processing section 210. That is, each of the side parts 104 of the resin film 100 is at least partially positioned at the cutout 212. Therefore, each of the side parts 104 is inclined downward toward the inside. Further, an inner end 104i of each of the side parts 104 of the resin film 100 is oriented downward. Further, the predetermined clearance CL is maintained between the lower processing section 210 and the upper processing section 224.

Figure 8A:
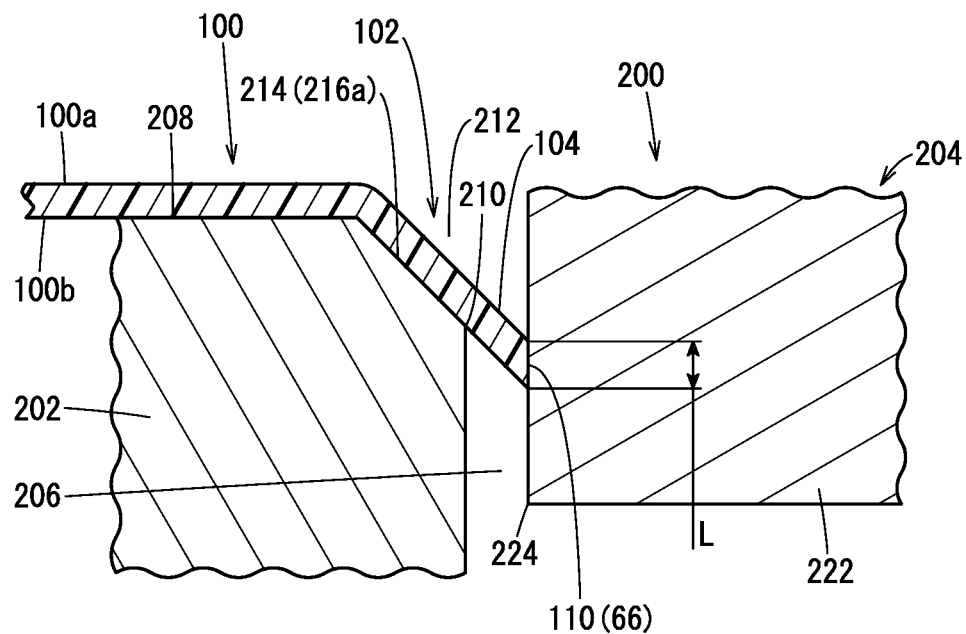
FIG. 8A is a third view illustrating the processing step.

Further, when the upper die 204 moves downward further, as shown in FIG. 8A, each of the side parts 104 of the resin film 100 is sheared by the upper processing section 224. At this time, the upper processing section 224 cuts (shears) each of the side parts 104 of the resin film 100 in a direction intersecting with the thickness direction of each of the side parts 104.

That is, the cut length L in the resin film 100 cut by the upper processing section 224 is larger than the thickness of the resin film 100. The cut surface 110 in the resin film 100 cut by the upper processing section 224 becomes the above described inclined surface 66. As a result, the above described resin frame member 22 is formed. The structure of inclination of the support surface 214 and the clearance CL are configured in a manner that the inclination angle θ of the inclined surface 66 (see FIG. 2) is, for example, preferably, not more than 45°, more preferably, not less than 15° and not more than 30°, and still more preferably, about 20°.

Figure 8B:
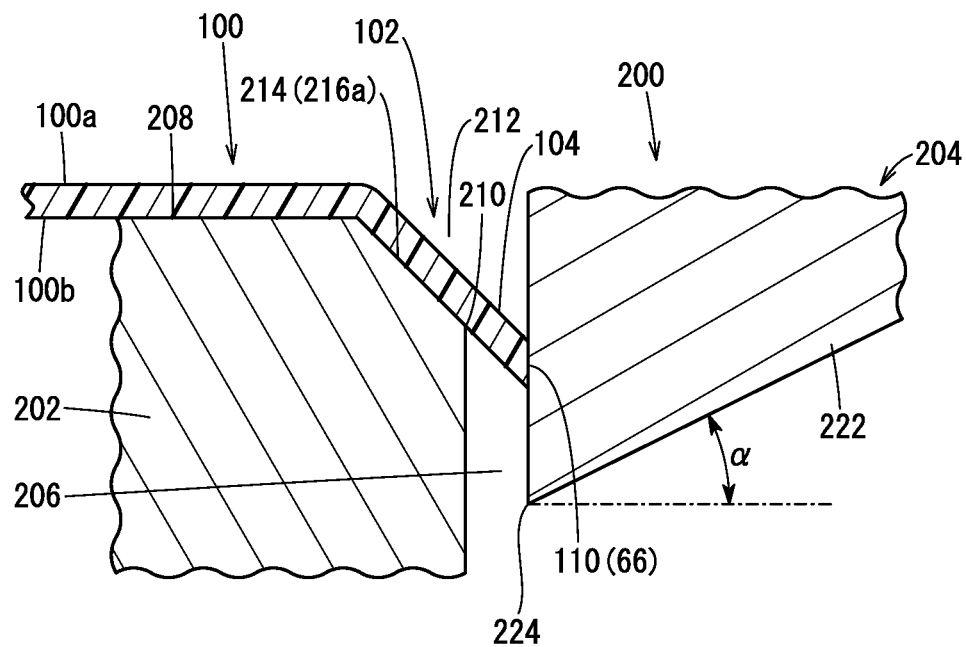
FIG. 8B is a view illustrating a punch according to a modified embodiment.

It should be noted that, as shown in FIG. 8B, the lower surface of the punch 222 may be inclined upward in a direction away from the upper processing section 224. That is, the angle α formed between the lower surface of the punch 222 and the horizontal surface may be an acute angle.

Figure 9A:
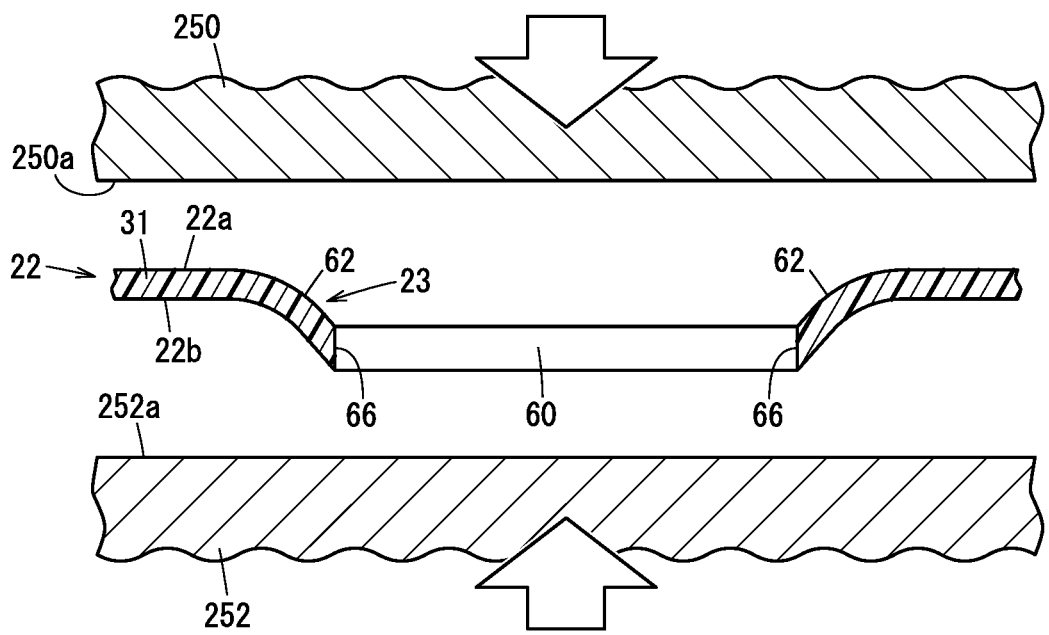
FIG. 9A is a first view illustrating a sandwiching step.
Figure 9B:
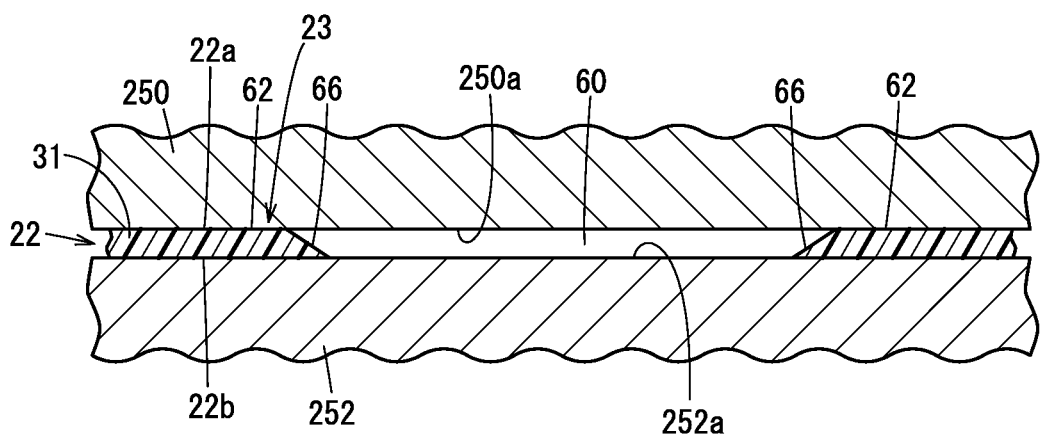
FIG. 9B is a second view illustrating the sandwiching step.

After the processing step, as shown in FIG. 9A, in the case where the inner peripheral end 23 of the resin frame member 22 is curved toward the other surface 22b of the resin frame member 22 from an outer peripheral portion 31, the sandwiching step (step S4 of FIG. 4) may be performed as necessary. In the sandwiching step, as shown in FIGS. 9A and 9B, the resin frame member 22 obtained in the processing step is sandwiched and pressed by planar surfaces 250a, 252a of a pair of pressing members 250, 252. In this manner, it is possible to correct the resin frame member such that the inner peripheral end 23 of the resin frame member 22 and the outer peripheral portion 31 are flush with each other.

After producing the resin frame member 22, the anode 26 and the cathode 28 provided with the electrolyte membrane 24 is prepared. Then, the inner peripheral end 23 of the resin frame member 22 is disposed between the outer peripheral portion 25 of the electrolyte membrane 24 and the outer peripheral portion 29 of the cathode 28, and these components are joined together. Specifically, by applying the heat and load to the anode 26, the electrolyte membrane 24, the resin frame member 22, and the cathode 28 that are stacked together in the thickness direction (by performing hot pressing), these components are joined together. As a result, the resin frame equipped MEA 14 is obtained. It should be noted that adhesive may be coated between the electrolyte membrane 24 and the resin frame member 22.

The method of producing the processing die 200 and the resin frame member 22 according to the embodiment of the present invention offers the following advantages.

The method of producing the resin frame member 22 (method of using the processing die 200) includes the placing step of placing the resin film 100 on the placement surface 208 of the lower die 202, and the processing step of, after the placing step, moving the upper die 204 toward the lower die 202 and shearing each of the side parts 104 by the lower processing section 210 of the lower die 202 and the upper processing section 224 of the upper die 204 to thereby form the inclined surface 66 on each of the side parts 104.

In the processing step, the shearing is performed while maintaining a predetermined clearance CL between the lower processing section 210 and the upper processing section 224 and in the state where each of the side parts 104 is at least partially positioned at the cutout (chamfered portion) 212, in order that each of side parts 104 is inclined downward toward the inside. The cutout 212 is formed by cutting off (chamfering) the edge part of the placement surface 208 that is positioned on the lower processing section 210 side.

In this method, while maintaining the predetermined clearance CL between the lower processing section 210 and the upper processing section 224, in the state where each of the side parts 104 is at least partially positioned at the cutout 212 of the lower die 202 and the inner face of each side part 104 is oriented downward so that each of side parts 104 is inclined downward toward the inside, each of the side parts 104 is sheared. In this configuration, the cut surface 110 of each of the side parts 104 cut by the upper processing section 224 and the lower processing section 210 becomes the inclined surface 66 inclined from the thickness direction of the resin frame member 22. Therefore, it is possible to form the inclined surface 66 efficiently.

The lower die 202 includes the support surface 214 formed on a part thereof where the cutout 212 is positioned, and the support surface is inclined downward from the placement surface 208 toward the lower processing section 210. The support surface 214 is the flat surface 216a. In the processing step, each of the side parts 104 is brought into contact with the support surface 214.

In this method, it is possible to accurately form the inclined surface 66 on each of the side parts 104 of the resin film 100 by the upper processing section 224.

The clearance CL is configured to have a size in the range of not less than 10 μm and not more than 60 μm.

In this case, the inclined surface 66 can be accurately formed on each of the side parts 104 of the resin film 100 while reducing occurrence of droop and burrs on the cut surface 110 of the resin film 100.

Further, in the processing die 200, the upper surface of the lower die 202 has the quadrangular insertion opening 206, the placement surface 208 on which the resin film 100 is placed so as to surround the insertion opening 206, the lower processing section 210 having a quadrangular annular shape and extending along the outer periphery of the insertion opening 206, and the cutout 212 formed by cutting off the edge part of the placement surface 208 that is located on the lower processing section 210 side. The upper die 204 has the punch 222 provided with the upper processing section 224 having a quadrangular shape, and the punch 222 is capable of being inserted into the insertion opening 206. The lower processing section 210 and the upper processing section 224 are configured to shear each of the side parts 104 by the lower processing section 210 and the upper processing section 224 in the state where the predetermined clearance is maintained between the lower processing section 210 and the upper processing section 224 when the upper die 204 is moved toward the lower die 202.

The processing die 200 offers the same effect and advantages as in the case of the method of producing the resin frame member 22 as described above.

Figure 10:
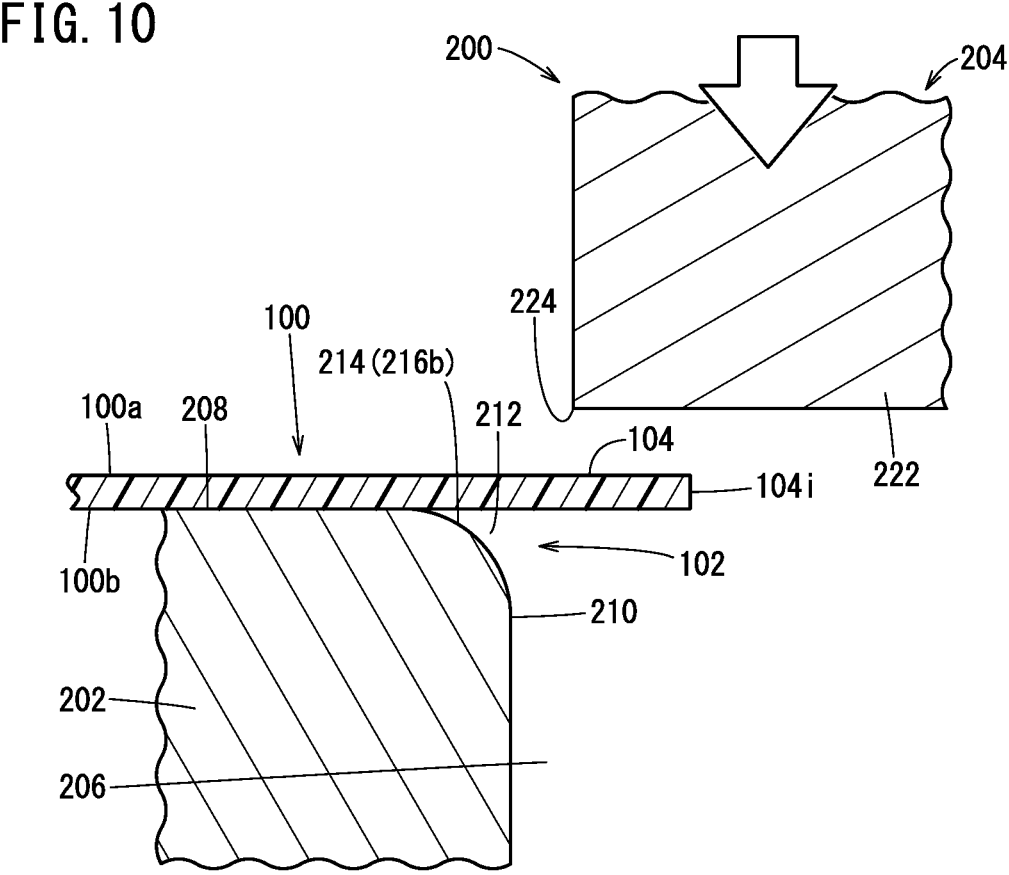
FIG. 10 is a cross sectional view showing a support surface of a lower die according to the modified embodiment.

The cutout 212 of the lower die 202 may be formed by round-chamfering (R chamfering), for example. In this case, preferably, the chamfered amount R of the R chamfering is set to be not less than 0.3 (R0.3) and not more than 2 (R2). Further, as shown in FIG. 10, the support surface 214 of the lower die 202 is in the form of a convex rounded surface 216b (protruding curved surface). Also in this case, the same advantages as in the case of the flat surface 216a as described above are obtained.

(Modified Embodiment)

Next, a processing die 200a and a method of producing the processing die 200a according to a modified embodiment will be described. In this modified embodiment, the constituent elements of the processing die 200a having the same structure as the above described processing die 200 are labelled with the same reference numerals, and the detailed description thereof is omitted.

As shown in FIG. 11, the processing die 200a includes a lower die 202a and an upper die 204. The lower die 202a includes a lower die member 203 with an insertion opening 206 being formed in an upper surface thereof. A quadrangular annular recess 230 (see FIG. 12A) is formed in an upper surface of the lower die member 203, along the outer periphery of the insertion opening 206. An inner surface of the recess 230 is coated with a coating member 232 (coating film member). Further, a placement surface 208 is provided on an upper surface of the lower die member 203.

Figure 12A:
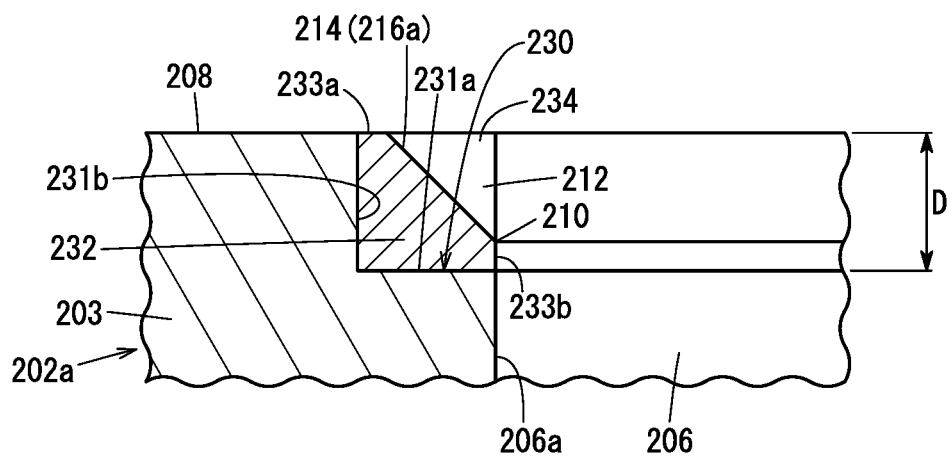
FIG. 12A is a cross sectional view taken along a line XIIA-XIIA in FIG. 11.

In FIG. 12A, the recess 230 communicates with the insertion opening 206. The recess 230 is formed by a first inner surface 231a and a second inner surface 231b. The first inner surface 231a extends in substantially parallel to the placement surface 208. The second inner surface 231b extends upward from the first inner surface 231a. The first inner surface 231a and the second inner surface 231b intersect with each other at a right angle. It should be noted that the angle formed between the first inner surface 231a and the second inner surface 231b can be determined as appropriate. Four corners of the recess 230 are formed to have an R shape (rounded shape) (circular arc shape) as viewed from above (see FIG. 11).

Examples of materials used for the coating member 232 are metal materials, ceramics materials, etc. Examples of the metal materials include cemented carbides such as tungsten carbide (WC) and pure tungsten. Examples of the ceramics materials include aluminum oxide ($Al_2O_3$), silicon carbide (SiC), zirconium dioxide ($ZrO_2$), etc.

The thickness D (membrane thickness) of the coating member 232 is the same as the height of the second inner surface 231b (depth of the recess 230). Preferably, the thickness D of the coating member 232 is configured to have a size in the range of not less than 100 μm and not more than 300 μm. The coating member 232 extends in a quadrangular annular pattern. The coating member 232 is provided in a manner to fill part of the recess 230. That is, the other part of the recess 230 which is not filled by the coating member 232 is left as the cutout 212.

Figure 12B:
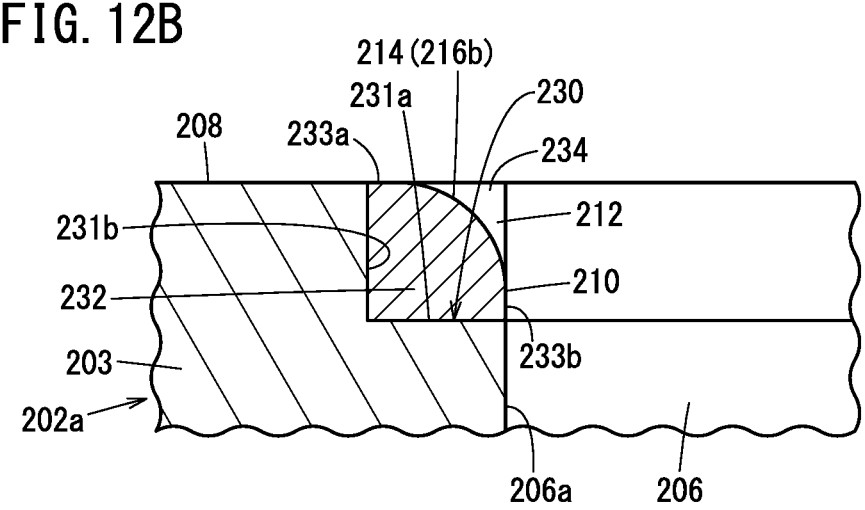
FIG. 12B is a cross sectional view showing a support surface of the lower die in FIG. 12A according to the modified embodiment.

The coating member 232 is provided with a lower processing section 210 and a support surface 214. Stated otherwise, each of the support surface 214 and the lower processing section 210 is formed by coating, with the coating member 232, the inner surfaces (the first inner surface 231a and the second inner surface 231b) of the recess 230. That is, the inner surfaces (the first inner surface 231a and the second inner surface 231b) of the recess 230 is coated with the coating member 232 in a manner that the support surface 214 and the lower processing section 210 are formed. Each of the support surface 214 is a flat surface 216a. It should be noted that each of the support surfaces 214 may be a protruding R surface (convex rounded surface) 216b (see FIG. 12B).

In FIG. 11, the lower processing section 210 and the support surface 214 extend straight along the outer periphery of the insertion opening 206. A corner part 234 having a quadrangular shape in cross section is provided between the adjacent support surfaces 214. Each of the corner parts 234 of the coating member 232 has an outer peripheral surface having an R shape (rounded shape) (circular arc shape).

Figure 13:
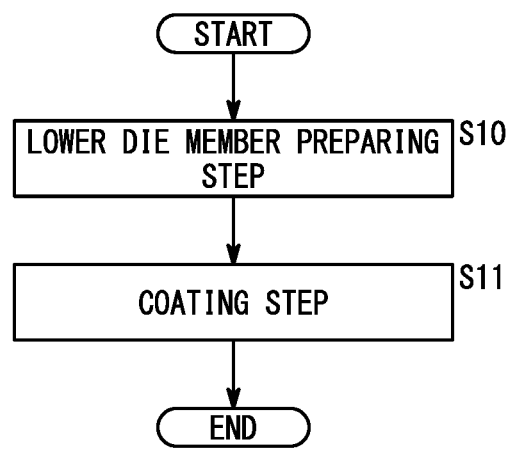
FIG. 13 is a flow chart showing a method of producing the processing die shown in FIG. 11.

Next, a method of producing the above described processing die 200a will be described. As shown in FIG. 13, the method of producing the processing die 200a includes a lower die member preparing step and a coating step.

Figure 14:
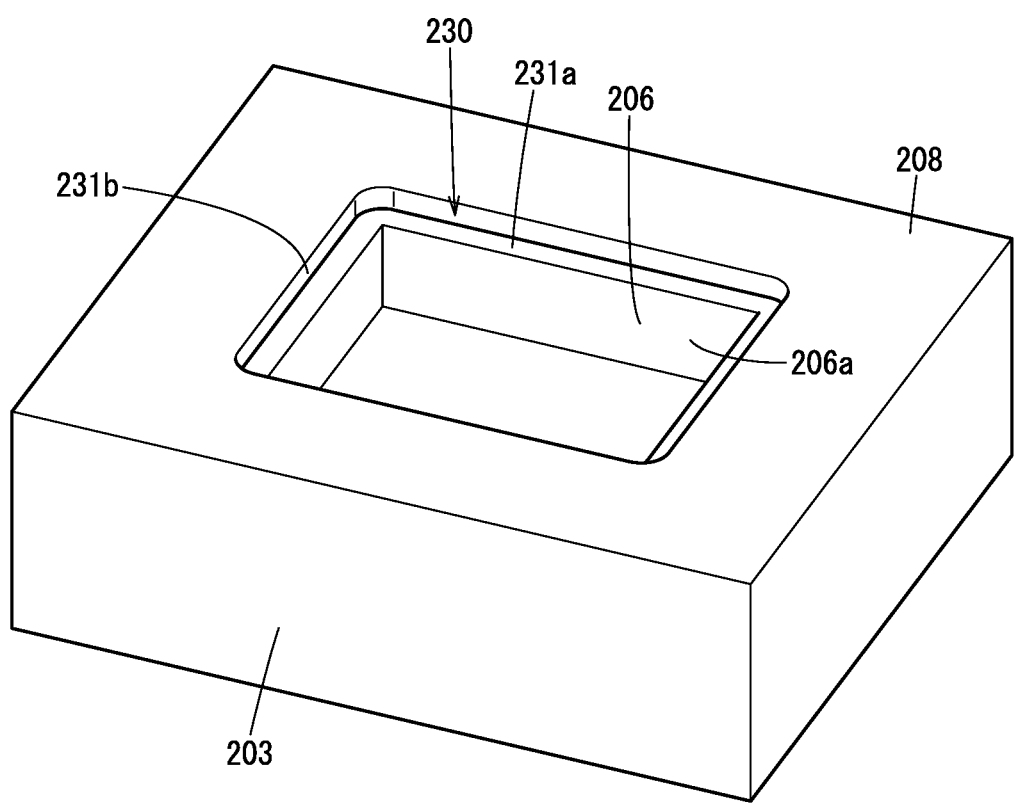
FIG. 14 is a perspective view showing a lower die member.

In the lower die member preparing step (step S10 in FIG. 13), as shown in FIG. 14, the lower die member 203 is prepared. Specifically, the lower die member 203 has a rectangular parallelepiped shape. The quadrangular insertion opening 206, the placement surface 208 on which the resin film 100 (see FIG. 11) is placed and positioned so as to surround the insertion opening 206, and the quadrangular annular recess 230 communicating with the insertion opening 206, are formed on the upper surface of the lower die member 203.

Then, in the coating step (step S11 in FIG. 13), the first inner surface 231a and the second inner surface 231b of the recess 230 are coated with the coating member 232 to thereby form the lower processing section 210 and the support surface 214 on the coating member 232. At this time, as shown in FIG. 11, the coating member 232 is applied to each of the first inner surface 231a and the second inner surface 231b entirely in a quadrangular annular pattern. In FIGS. 11 and 12A, the upper surface 233a of the coating member 232 is continuous with the placement surface 208 smoothly without any steps. The inner surface 233b of the coating member 232 (surface facing toward the insertion opening 206) is smoothly continuous with the inner surface 206a of the lower die member 203 forming the insertion opening 206, without any steps (see FIG. 12A).

In the modified embodiment, in the coating step, the first inner surface 231a and the second inner surface 231b of the recess 230 are coated with the coating member 232 by thermal spraying. In this case, examples of material for the coating member 232 include the metal materials or the ceramics materials described above.

The coating step is not limited to the coating by thermal spraying. In the coating step, the first inner surface 231a and the second inner surface 231b of the recess 230 may be coated with the cover member 232 by build-up or overlaying. In this case, examples of material for the coating member 232 include the metal materials described above.

The processing die 200a according to the modified embodiment offers the same advantages as the processing die 200 as described above.

In the processing die 200a according to the modified embodiment, the quadrangular annular recess 230 is formed along the outer periphery of the insertion opening 206, on the upper surface of the lower die 202a. The first inner surface 231a and the second inner surface 231b of the recess 230 are coated with the coating member 232, and the support surface 214 and the lower processing section 210 are provided on the coating member 232.

Further, the method of producing the processing die 200a according to the modified embodiment includes the lower die member preparing step and the coating step. In the lower die member preparing step, the lower die member 203 is prepared. The lower die member 203 has, formed on an upper surface thereof, the quadrangular insertion opening 206, the placement surface 208 on which the resin film 100 is placed and positioned so as to surround the insertion opening 206, and the quadrangular annular recess 230 extending along the outer periphery of the insertion opening 206. In the coating step, after the lower die member preparing step, the first inner surface 231a and the second inner surface 231b of the recess 230 are coated with the coating member 232, whereby the lower processing section 210, which is positioned along the outer periphery of the insertion opening 206, is formed on the coating member 232. In the coating step, the coating member 232 is applied to the first inner surface 231a and the second inner surface 231b of the recess 230 in a manner that the cutout 212 is provided at the edge part of the placement surface 208 that is positioned on the lower processing section 210 side.

In this regard, in the case of forming the cutout 212 by machining the inner end (inner edge) of the lower die member 203 closer to the position of the insertion opening 206, long time and huge cost are required. However, in the structure and the method, the cutout 212 and the lower processing section 210 are formed by coating the lower die member with the coating member 232. Thus, in comparison with the case where the cutout 212 and the lower processing section 210 are formed by machining of the lower die member 203, it is possible to reduce the time and the cost required for producing the lower die 202a.

In the coating step, the first inner surface 231a and the second inner surface 231b of the recess 230 is coated with the coating member 232 to thereby form the support surface 214 inclined downward from the placement surface 208 toward the lower processing section 210, on the coating member 232.

In this method, it is possible to form the support surface 214 on the lower die 202a easily and accurately.

The coating member 232 may be made of metal material containing tungsten or ceramics material.

In the structure, it is possible to improve the durability of the support surface 214 and the lower processing section 210.

In the method of producing the processing die 200a, in the coating step, the coating member 232 is coated on the first inner surface 231a and the second inner surface 231b of the recess 230 by thermal spraying.

In this method, it is possible to form the support surface 214 and the lower processing section 210 easily and accurately.

In the method of producing the processing die, in the coating step, the coating member 232 may be coated on the first inner surface 231a and the second inner surface 231b of the recess 230 by build-up coating.

In this method, it is possible to form the support surface 214 and the lower processing section 210 easily and accurately.

The present invention is not limited to the above embodiments. Various modifications can be made without departing from the gist of the present invention.

The above embodiments can be summarized as follows.

The above embodiments disclose the method of producing the resin frame member (22) for the fuel cell. The resin frame member is provided on the outer peripheral portion of a membrane electrode assembly (20). The method is performed by forming the inclined surface (66) on each of side parts (104) of the inner peripheral end (102) surrounding the quadrangular opening (60) formed at the center of the resin film (100). The method includes the placing step of placing the resin film on the placement surface (208) of a lower die (202, 202a) and the processing step of, after the placing step, moving the upper die (204) toward the lower die and shearing each of the side parts by the lower processing section (210) of the lower die and the upper processing section (224) of the upper die, to thereby form the inclined surface on each of the side parts. In the processing step, the shearing is performed while maintaining a predetermined clearance (CL) between the lower processing section and the upper processing section and in the state where each of the side parts is at least partially positioned at the cutout (212) so that each of the side parts is inclined downward toward the inside, the cutout (212) being formed by cutting off an edge part of the placement surface that is positioned on a side closer to the lower processing section.

In the method of producing the resin frame member for the fuel cell, the lower die may include the support surface (214) formed on a part thereof where the cutout is positioned, the support surface being inclined downward from the placement surface toward the lower processing section, the support surface may be the flat surface (216a) or the convex rounded surface (216b), and in the processing step, each of the side parts may be brought into contact with the support surface.

In the method of producing the resin frame member for the fuel cell, the clearance may be configured to have a size in the range of not less than 10 μm and not more than 60 μm.

The above embodiment discloses the processing die (200, 200a) used in the method of producing the resin frame member for the fuel cell described above. The processing die includes the lower die and the upper die disposed to face each other in a manner that the lower die and the upper die can move close to and away from each other. The upper surface of the lower die includes the quadrangular insertion opening (206), the placement surface on which the resin film is placed and positioned so as to surround the insertion opening, the lower processing section having a quadrangular annular shape and extending along the outer periphery of the insertion opening, and the cutout formed by cutting off an edge part of the placement surface that is positioned on a side closer to the lower processing section. The upper die includes the punch (222) provided with the upper processing section having a quadrangular shape, and the punch is capable of being inserted into the insertion opening. The lower processing section and the upper processing section are configured to shear each of the side parts in the state where the clearance is maintained between the lower processing section and the upper processing section when the upper die is moved toward the lower die.

In the processing die, the lower die may include the support surface formed on a part thereof where the cutout is positioned, the support surface being inclined downward from the placement surface toward the lower processing section, and the support surface may have the flat surface or the convex rounded surface.

In the processing die, the upper surface of the lower die may include the quadrangular annular recess (230) formed along the outer periphery of the insertion opening. An inner surface of the recess may be coated with the coating member (232), and the support surface and the lower processing section may be provided on the coating member.

In the processing die, the coating member may be made of metal material containing tungsten or ceramics material.

In the processing die, the support surface may extend over the entire length of each of the sides of the lower processing section, and the corner part (218) having a quadrangular shape in lateral cross section may be positioned between the support surfaces that are adjacent to each other.

The above embodiment discloses the method of producing the processing die for producing the resin frame member provided in the outer peripheral portion of the membrane electrode assembly, by forming the inclined surface in each of the side parts of the inner peripheral end surrounding the quadrangular opening formed at the center of the resin film. The method includes the lower die member preparing step of preparing the lower die member (203) having the quadrangular insertion opening, the placement surface positioned to surround the insertion opening in a manner that the resin film can be placed on the placement surface, and the quadrangular annular recess extending along the outer periphery of the insertion opening, on the upper surface of the lower die member, and the coating step of forming the lower processing section positioned along the outer periphery of the insertion opening on the coating member, by coating the coating member on the inner surface of the recess after the lower die member preparing step. In the coating step, the coating member is coated on the inner surface of the recess in a manner that the recess is provided at the edge part of the placement surface that is positioned on the lower processing section side.

In the method of producing the processing die, in the coating step, the coating member may be coated on the inner surface of the recess to form the support surface inclined downward from the placement surface toward the lower processing section, in the coating member.

In the method of producing the processing die, in the coating step, the coating member may be coated on the inner surface of the recess by thermal spraying.

In the method of producing the processing die, in the coating step, the coating member may be coated on the inner surface of the recess by build-up coating.

What is claimed is:

1. A method of producing a resin frame member for a fuel cell, the resin frame member being provided on an outer peripheral portion of a membrane electrode assembly, the method being performed by forming an inclined surface on each of side parts of an inner peripheral end of a resin film, the inner peripheral end surrounding a quadrangular opening formed at a center of the resin film, the method comprising:
placing the resin film on a placement surface of a lower die; and
after the placing of the resin film, moving an upper die toward the lower die and shearing each of the side parts by a lower processing section of the lower die and an upper processing section of the upper die, to thereby form the inclined surface on each of the side parts,
wherein, in the shearing of each of the side parts, the shearing is performed while maintaining a predetermined clearance between the lower processing section and the upper processing section and in a state where each of the side parts is at least partially positioned at a cutout so that each of the side parts is inclined downward toward an inside, the cutout being formed by cutting off an edge part of the placement surface that is positioned on a side closer to the lower processing section.

2. The method of producing the resin frame member for the fuel cell according to claim 1, wherein the lower die includes a support surface formed on a part thereof where the cutout is positioned, the support surface being inclined downward from the placement surface toward the lower processing section, and the support surface is a flat surface or a convex rounded surface; and
in the shearing of each of the side parts, each of the side parts is brought into contact with the support surface.

3. The method of producing the resin frame member for the fuel cell according to claim 1, wherein the clearance is configured to have a size in a range of not less than 10 μm and not more than 60 μm.

4. A processing die used in a method of producing a resin frame member for a fuel cell, the resin frame member being provided on an outer peripheral portion of a membrane electrode assembly, the method being performed by forming an inclined surface on each of side parts of an inner peripheral end of a resin film, the inner peripheral end surrounding a quadrangular opening formed at a center of the resin film, the method comprising:
placing the resin film on a placement surface of a lower die; and
after the placing of the resin film, moving an upper die toward the lower die and shearing each of the side parts by a lower processing section of the lower die and an upper processing section of the upper die, to thereby form the inclined surface on each of the side parts,
wherein, in the shearing of each of the side parts, the shearing is performed while maintaining a predetermined clearance between the lower processing section and the upper processing section and in a state where each of the side parts is at least partially positioned at a cutout so that each of the side parts is inclined downward toward an inside, the cutout being formed by cutting off an edge part of the placement surface that is positioned on a side closer to the lower processing section,
the processing die comprising:
the lower die and the upper die disposed to face each other in a manner that the lower die and the upper die are movable close to and away from each other,
wherein an upper surface of the lower die includes:
a quadrangular insertion opening;
the placement surface on which the resin film is placed and positioned so as to surround the insertion opening;
the lower processing section having a quadrangular annular shape and extending along an outer periphery of the insertion opening; and
the cutout formed by cutting off an edge part of the placement surface that is positioned on a side closer to the lower processing section,
and wherein the upper die includes a punch provided with the upper processing section having a quadrangular shape, the punch being configured to be insertable into the insertion opening; and
the lower processing section and the upper processing section are configured to shear each of the side parts in a state where the clearance is maintained between the lower processing section and the upper processing section when the upper die is moved toward the lower die.

5. The processing die according to claim 4, wherein the lower die includes a support surface formed on a part thereof where the cutout is positioned, the support surface being inclined downward from the placement surface toward the lower processing section; and the support surface has a flat surface or a convex rounded surface.

6. The processing die according to claim 5, wherein the upper surface of the lower die includes a quadrangular annular recess formed along an outer periphery of the insertion opening;

an inner surface of the recess is coated with a coating member; and the support surface and the lower processing section are provided on the coating member.

7. The processing die according to claim 6, wherein the coating member is made of metal material containing tungsten or ceramics material.

8. The processing die according to claim 5, wherein the support surface extends over an entire length of each of the sides of the lower processing section; and a corner part having a quadrangular shape in lateral cross section is positioned between the support surfaces that are adjacent to each other.

\* \* \* \* \*